G. W. STEELMAN, E. H. SAWYER & M. FELS.
AUTOMATIC CORING MACHINE.
APPLICATION FILED FEB. 10, 1913.
1,066,233.
Patented July 1, 1913.
2 SHEETS—SHEET 2.
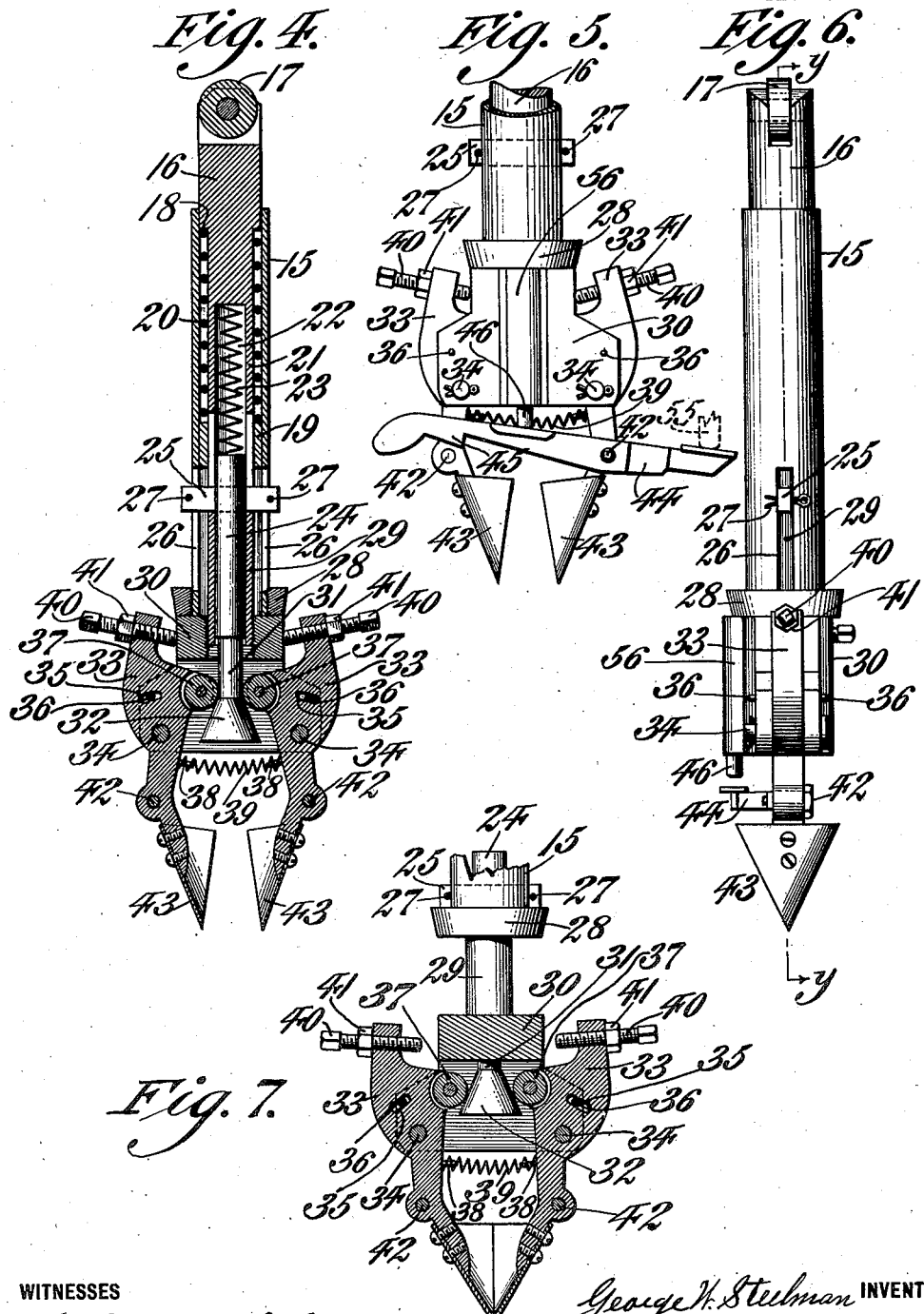
WITNESSES
INVENTORS
George W. Steelman
Eyrd H. Sawyer
Maurice Fels
BY
Niedersheim & Fairbanks
ATTORNEYS

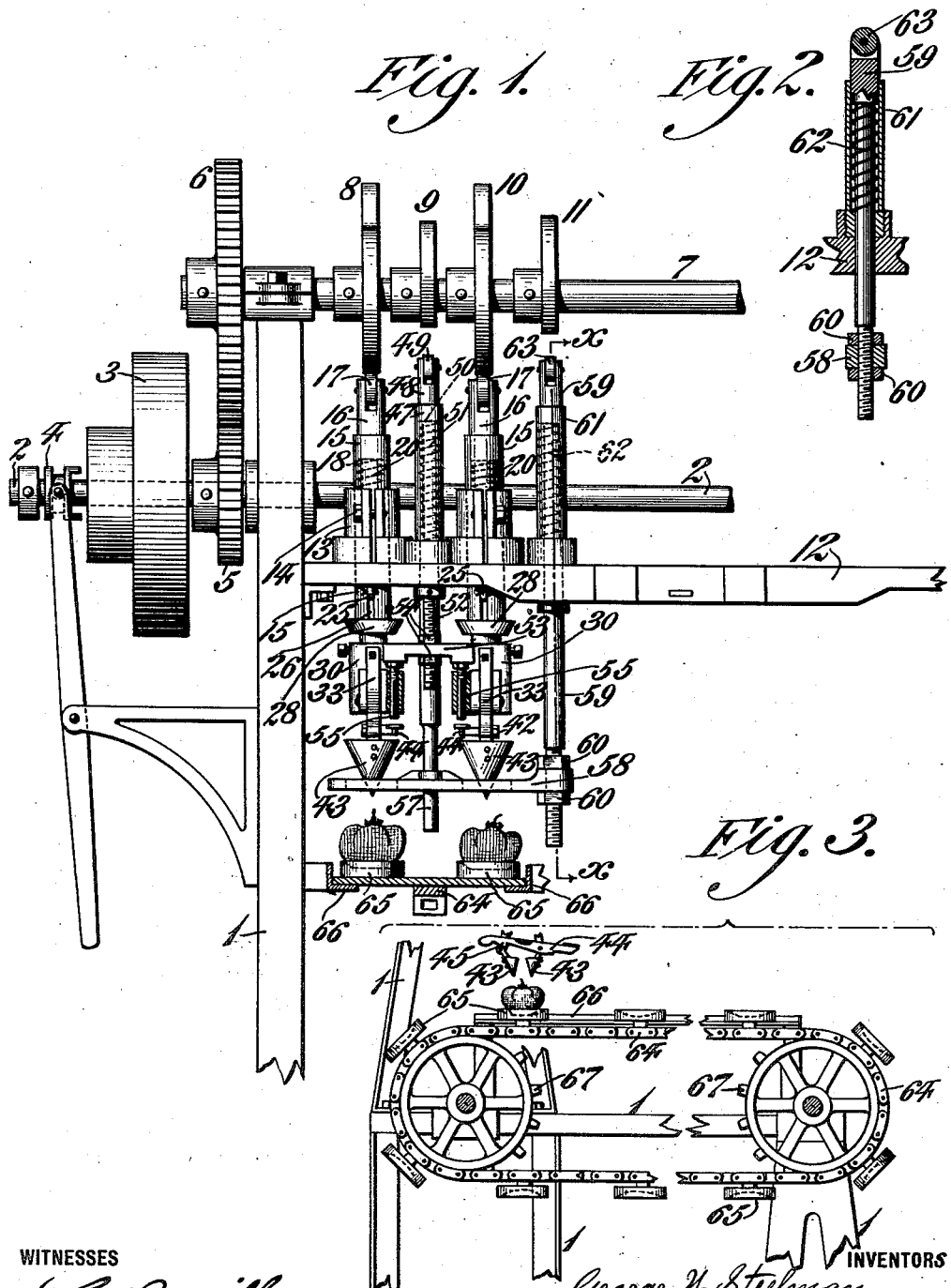

UNITED STATES PATENT OFFICE.

GEORGE W. STEELMAN AND EZRA H. SAWYER, OF VINELAND, NEW JERSEY, AND MAURICE FELS, OF PHILADELPHIA, PENNSYLVANIA, ASSIGNORS TO NIPPER MACHINE COMPANY, OF NORMA, NEW JERSEY, A CORPORATION OF NEW JERSEY.

AUTOMATIC CORING-MACHINE.

1,066,233.  Specification of Letters Patent.  Patented July 1, 1913.

Application filed February 10, 1913. Serial No. 747,430.

*To all whom it may concern:*

Be it known that we, GEORGE W. STEELMAN and EZRA H. SAWYER, both citizens of the United States, residing at Vineland, in the county of Cumberland, State of New Jersey, and MAURICE FELS, a citizen of the United States, residing in the city and county of Philadelphia, State of Pennsylvania, have invented a new and useful Automatic Coring-Machine, of which the following is a specification.

Our present invention consists of a novel construction of an automatic coring machine, adapted to be employed to remove the cores from fruits or vegetables, such as tomatoes, apples, or the like, or to remove the eyes from pineapples, and spots or the like from other fruits or vegetables, and consists of a coring implement, and novel means to automatically actuate the same.

It further consists of a novel construction of an automatic coring machine wherein the coring implements are reciprocated in a novel manner with respect to the articles to be cored, which latter are continuously fed into register therewith, novel means being provided for preventing the articles being cored from adhering to the coring implements.

It further consists of a novel construction of a coring machine, wherein a coring implement is employed, and novel means for positively opening and closing said coring implement at the proper time, and for locking the coring implement in closed position, and causing the same to automatically open.

It further consists of other novel features of construction, all as will be hereinafter fully set forth.

For the purpose of illustrating our invention, we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of these instrumentalities as herein shown and described.

Figure 1 represents a sectional elevation of a portion of a coring machine, embodying our invention. Fig. 2 represents a section on line $x$—$x$, Fig. 1. Fig. 3 represents a side elevation of a portion of our novel coring machine. Fig. 4 represents a section on line $y$—$y$ of Fig. 6, showing certain parts in the position there shown when in open position. Fig. 5 represents a side elevation of Fig. 6. Fig. 6 represents a side elevation of a coring implement and certain of its adjuncts. Fig. 7 represents a sectional elevation showing certain of the parts seen in Fig. 4 in a different relation with respect to each other.

Similar numerals of reference indicate corresponding parts in the figures.

Referring to the drawings: 1 designates the frame of the machine the construction of which, as is apparent, may vary widely in practice and in the present instance we have deemed it unnecessary to illustrate the entire frame.

2 designates a driving shaft mounted in the frame 1 and provided with a pulley 3 loosely mounted thereon and adapted to be connected with any desired source of power, said pulley 3 being adapted to interlock with the manually actuated clutch member 4, whereby the shaft 2 will be driven in the usual manner.

5 designates a gear fixed on the shaft 2 and intermeshing with a gear 6 preferably of larger diameter than the gear 5 and mounted on the shaft 7 journaled in the frame 1 of the machine. The shaft 7 has fixed thereon a series of cams 8, 9, 10 and 11 adapted to coöperate with mechanism which will hereinafter be described.

12 designates a cross bar secured to the frame 1 of the machine.

13 designates a sleeve carried by the cross bar 12 and having a side thereof split and provided with a set screw 14, whereby a tubular casing 15 may be fixed with respect thereto. Within the sleeve 15 is slidably mounted a plunger 16 having journaled at its outer end a roller 17. The plunger is provided with a reduced diameter to form a preferably internal shoulder 18 between which and an annulus 19 carried by the outer sleeve 15 is located a spring 20, the reduced portion 21 of said plunger being adapted to pass into said annulus 19. The lower end of the plunger 16 is apertured as at 22, in order to receive a spring 23, one end of which bears against the rear wall of said aperture 22, while the forward end abuts against the rod 24 having a cross bar or thrust member 25 secured thereto and extending through the slots 26 in the outer sleeve 15 and said cross bar in the present instance is provided with a pin 27 passing therethrough, in order to prevent improper movement of such bar. The lower end of said sleeve 15 is in threaded engagement with the nut 28. The rod 24 has a bearing in a sleeve 29 of the plunger 16 which at its lower end is secured to a head 30, and in the present instance, said sleeve is in threaded engagement with said head. The rod 24 is provided with a reduced diameter 31 which terminates in a conical head or bearing 32. The head 30 serves as a supporting means for the cutter arms 33, two of which are employed in the present instance, and each arm is pivotally connected to the head as at 34, and provided with an inclined slot 35 into which extends a pin 36 carried by the head 30.

37 designates a roller rotatably mounted in the arm 33 and adapted to coöperate with the reduced neck 31 and conical bearing 32 of the rod 24. Each arm 33 is provided with a pin or abutment 38 with which coöperates the compression spring 39, whereby the set screws 40 normally abut against the side of the head 30, said set screws being located in their adjusted position by means of lock nuts 41.

42 designates a pin carried by each arm 33.

43 designates a coring knife or cutter which preferably has the shape of one-half an axially conical shell and the two coring arms are slightly diverging so that the straight cutting edges of the scoops or cutters will be brought completely together when the arms are closed, as seen in Fig. 7, thus forming segments of a conical shell.

44 designates a lever fulcrumed on one of the pins 42 provided with a catch 45 adapted to coöperate with the other pin 42 on the other arm when the head 30 has been moved downwardly and the head 30 is preferably provided with a plunger 46 adapted to contact with said lever 44 and positively lock the same on the downward movement of the head 30.

In order to unlock the catch 45 we provide novel unlocking means actuated by the cam 9 and such mechanism will now be described.

47 designates a sleeve carried by the cross bar 12, in any desired manner, and within this sleeve is slidably mounted a plunger 48 having at its upper end a roller 49 adapted to coöperate with the cam 9. The plunger 48 is provided with a reduced diameter thereby forming a shoulder 50, between which and the cross bar 12 is interposed a spring 51, whereby said plunger 48 is normally maintained in its raised position. The lower end of the plunger 48 is threaded, as is indicated at 52, thereby adapting the same to receive an arm 53 which is adjustably connected with said plunger 48 by means of nuts 54 located on opposite sides of said arm 53.

55 designates rods carried by the arm 53, two of said rods being provided in the present instance, in order that a single plunger is provided which will operate to unlock the levers 44 of two sets of coring implements. In the present instance, the rods 46 are guided in an apertured boss 56 on the heads 30, and are adapted to contact with the lever 44, which is constructed to form a contact portion to be engaged by said rods 46.

57 designates a guide rod on which is guided a clamping member or stripper 58, preferably apertured to permit a portion of the coring implements to pass therethrough, said stripper 58 being mounted on the threaded extension of the plunger 59 and secured in adjusted position with respect thereto by means of nuts 60 located on opposite sides of said stripper 58. The plunger 59 is mounted within a sleeve 61 carried by the cross bar 12 and a spring 62 is interposed between the shoulder on said plunger 59 and the cross bar 12, in order to normally maintain said plunger in its elevated position, as seen in Fig. 1.

63 designates a roller carried by the plunger 59, and adapted to coöperate with the cam 11, on the shaft 7.

64 designates a conveyer of any desired type, provided with article receiving members 65, it being understood that the frame is provided with guides 66 whereby the articles to be cored will be brought into register with the coring implements 43. The conveyer 64 may be of any desired or conventional construction and driven in any desired manner, sprocket wheels 67 being shown in the present instance, which are adapted to be driven by any desired or conventional type of mechanism, and we have, therefore, deemed it unnecessary in the present instance to illustrate and describe in detail such mechanism. The article holders 65 are preferably spaced from each other.

The operation of our novel coring machine will now be readily apparent to those skilled in the art, to which this invention appertains and is as follows:—The conveyer is preferably arranged and actuated in such a manner that it will operate at a comparatively slow and continuous speed, while the coring implements will be intermittently reciprocated at a relatively rapid speed. Assuming now that the shaft 2 is rotated, it will be apparent that owing to the provision of the gears 5 and 6, the shaft 7 will be driven in unison therewith. The parts are timed in such a manner that when an article to be cored, such as for example, a tomato, is brought into register with a coring implement, the cam 8 will coact with the roller 17 in such a manner as to depress the plunger 16, the result of which is to cause the plunger 16 and the head 30 and its adjuncts to move downwardly and the coring implements 43 to be forced into engagement with the article to be cored, it being understood that the cutting knives 43 are at this time in the open position seen in Fig. 4. On the further downward movement of the plunger 16, it will be apparent that the bar 25 will engage the stop 28, which is carried by the stationary sleeve 15, so that on the continued downward movement of the plunger 16 the head 30 will move downwardly therewith, the result of which will be to cause the roller 37 to ride up on the face of the conical bearing 32, thereby causing the cutting faces 43 of the coring implements to close, as will be understood by reference to Fig. 7. The parts are so timed that the clamping member or stripper 58, has at this time been moved downwardly on the guide 57 owing to the engagement of the cam 11 with the roller 63, of the plunger 59. As the plungers 16 reach the limit of their downward stroke, the lever 44 will fall due to its own weight which is assured by the pin 46 in contact with the lever 44, and the catch 45 will interlock with a pin 42, and thereby prevent the coring implements 43 from opening, and these coring implements will now be returned to their initial position owing to the provision of the springs 20. As the coring implements are being returned to their initial position, in the manner just described, and at a time when the article holders 65 are out of register with the coring implements 43, the cam 9 will coact with the roller 49, to cause the plunger 48 to move downwardly, thereby causing the rods 55 to contact with the end of the lever 44, and cause the catch 45 to become unlocked from the pin 42, which will permit the coring implements 43 to open outwardly owing to the provision of the compression spring 39, and the core which has been removed from the article, will drop through the conveyer 64. It is to be understood that this conveyer 64 is driven at a comparatively slow speed, while the cam shaft 7 is driven at a comparatively high speed, so that the core is removed from the articles during the continuous travel of the latter.

It will be apparent that the clamping member or stripper 58 may be readily adjusted with respect to the articles to be cored, by actuating the nut 60. The time at which the coring implements are caused to open, may be readily adjusted by actuating the nuts 54.

It will be apparent that any desired number of coring implements may be carried by the cross bar 12, having operating cams therefor on the shaft 7, and the conveyer 64 may be made of such width as to provide for the employment of any desired number or units of coring implements and their operating mechanism. Owing to the provision of the clamping member or stripper 58, the articles which are being cored are prevented from being raised out of position with respect to their holder 65, on the upward movement of the coring implement.

It will now be apparent that we have devised a novel and useful construction of a coring implement, and automatic coring machine which embodies the features of advantage enumerated as desirable in the statement of the invention and the above description, and while we have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described our invention, what we claim as new and desire to secure by Letters Patent, is:—

1. In a coring machine, a coring implement comprising a plurality of members forming a tapering shell and adapted to be moved toward and away from each other, a series of receptacles for the articles to be cored, means for moving one of said elements toward and from the other, means for successively bringing each of said receptacles and the coring implement in register, means for imparting operative movement to such coring implement, and devices for preventing a cored article adhering to said coring implement.

2. In a coring machine, a coring implement composed of a plurality of cutter blades forming segments of a conical shell, means for moving such implement toward and from the articles to be cored, means for closing and opening such blades during their movement respectively toward and from such article, and devices for locking and unlocking such blades during their movement respectively toward and from such article.

3. In a coring machine, a coring implement composed of a plurality of cutter blades forming segments of a conical shell, a receptacle for the article to be cored, means for imparting a continuous travel to said receptacle, means to move said cutter blades toward and away from said receptacle, and during such movement to cause them to open and close, locking mechanism for said blades, devices to unlock said locking mechanism, and means for temporarily retaining an article in said receptacle during the coring operation.

4. In a coring machine, a coring implement composed of a plurality of cutter blades, a tension device normally maintaining said blades in open position, a cam member located between said blades, a plunger yieldingly connected with said cam member and with said cutter blades, and means to actuate said plunger, to cause said cutter blades to travel a predetermined distance in open position and to coöperate with said cam on a further movement and automatically close.

5. In a coring machine, a coring implement composed of a plurality of cutter-blades forming segments of a tapering shell, a receptacle for the article to be cored, means for moving one of said elements toward and from the other, means for closing said blades at the latter part of the movement of said elements toward each other, means for locking said blades in closed position, and means for unlocking said blades during the separating movement of said elements.

6. In a coring machine, a coring implement composed of a plurality of cutter-blades forming segments of a tapering shell, a receptacle for the article to be cored, means for moving one of said elements toward and from the other, means for closing and opening such blades respectively during the movement of one of said elements toward and from the other, and means for locking such blades in closed position at the latter part of the movement of said elements toward each other and retaining them in such position during the first part of their separating movement and again unlocking them at said latter movement.

7. In a coring machine, a coring implement composed of a plurality of cutter-blades forming segments of a tapering shell, a receptacle for the article to be cored, means for moving one of said elements toward and from the other, means for closing and opening said blades respectively during the movement of one of said elements toward and from the other, means for locking said blades during part of the separating movement of said elements, and means for retaining the object upon its receptacle during the separating movement of said elements.

8. In a coring machine, a rigidly supported tube, a plunger slidable in said tube, a spring acting against said plunger to move it outward, cutter-arms fulcrumed at the inner end of said plunger and provided with converging cutter-blades, means for automatically opening said arms and blades, a rod axially slidable in the inner portion of the plunger and formed with a reduced neck and a tapering head at its end adapted to engage the cutter arms, and a thrust-member upon said rod and adapted to engage and be stopped by the rigid sleeve as the plunger is moved inward.

GEORGE W. STEELMAN.
EZRA H. SAWYER.
MAURICE FELS.

Witnesses:
　LEWIS BARD,
　JOHN W. SHORT.